United States Patent [19]
Caudill

[11] 3,830,954
[45] Aug. 20, 1974

[54] APPARATUS FOR SHIELDING AGAINST ELECTROMAGNETIC INTERFERENCE

[75] Inventor: Herman T. Caudill, Hyattsville, Md.

[73] Assignee: The Singer Company, Binghamton, N.Y.

[22] Filed: June 26, 1973

[21] Appl. No.: 373,754

Related U.S. Application Data

[63] Continuation-in-part of Ser. No. 293,099, Sept. 28, 1972, abandoned.

[52] U.S. Cl. ............... 174/35 MS, 307/91, 325/257
[51] Int. Cl. ............................................ H05k 9/00
[58] Field of Search...... 325/257; 174/35 R, 35 MS, 174/35 GC, 78, 92; 307/91; 339/143

[56] References Cited

UNITED STATES PATENTS

| | | | |
|---|---|---|---|
| 1,960,938 | 5/1934 | Forbes | 325/357 |
| 3,322,885 | 5/1967 | May et al. | 174/78 |

FOREIGN PATENTS OR APPLICATIONS

| | | | |
|---|---|---|---|
| 713,389 | 8/1954 | Great Britain | 174/92 |
| 1,441,114 | 5/1969 | Germany | 174/35 GC |

OTHER PUBLICATIONS

"An Application Guide For Electromagnetic Compatibility," Chomerus, Inc., 1969, (Rec. Patent Office 10/13/69), P. 1, 4, and 6.

*Primary Examiner*—David Smith, Jr.
*Attorney, Agent, or Firm*—James C. Kesterson; Francis L. Masselle

[57] ABSTRACT

Apparatus for preserving the integrity of electromagnetic interference protection in electrical information transmission systems when transmission lines penetrate cabinets and similar enclosures. A structure is placed over the opening in the wall of an equipment cabinet through which transmission line cables pass. The structure comprises a metallic frame containing a deformable electrically conductive material in direct contact with the frame. The cables, stripped of their external insulation in order to expose their shielding for a short distance, are passed through the conductive material so that the exposed portions of each cable's shielding is surrounded by the conductive material. With the cables in place, a compression member compresses the conductive material tightly around the cables to form a tight, electrically conductive contact between the conductive material and the cable shielding. In this manner all the cable shields are grounded at the point where they penetrate the cabinet.

7 Claims, 5 Drawing Figures

APPARATUS FOR SHIELDING AGAINST ELECTROMAGNETIC INTERFERENCE

CROSS-REFERENCE TO RELATED APPLICATION

This application is a continuation-in-part of Ser. No. 293,099 filed Sept. 28, 1972 now abandoned in the name of Herman T. Caudill entitled Electromagnetic Interference Prevention.

BACKGROUND OF THE INVENTION

1. Field of the Invention

This invention relates to electrical communication equipment, and more particularly, to electrical communication equipment which is shielded to prevent interference from external electrical fields and cross-talk within the system.

Cross-talk has been a major problem in communication systems for many years. This is particularly true where the strength of the signals within the communication system is low. In addition, interference from outside sources of electromagnetic energy are a particular hazard where the communication equipment is situated in close proximity to strong electromagnetic field generators. One example of the type of location which is particularly vulnerable to EM (electromagnetic) interference (EMI) is in many military installations where high-powered radio and radar equipment may readily interfere with each other. Another problem location is the installation of communication and similar equipment in an electrical power generating station where strong EM fields may cause serious interference with all communication systems.

2. Description of the Prior Art

One of the earliest forms of devices for reducing external interference was the use of a screen cage. The low power communication equipment was contained within a room which was entirely enclosed by copper screening. The screen was grounded and care taken to provide conductive paths between the walls and all doors and similar openings. Screen rooms provide adequate protection where it is feasible to build such a structure. However, as the power of generating systems - both radio and power systems — grew in size, the effectiveness of the screen room decreased. In systems which utilize computers for control purposes, the equipment very often is included in a plurality of separate cabinets. While it may be feasible to place the entire control system including the computer in a screen room, it is not feasible or economical to build a separate screen room around each cabinet. In situations of this nature, even if the entire system is contained in a screen room, there is interference from one part of the equipment or system with another.

In order to overcome these problems, the prior art provided shielded cables, grounded cabinets, and means for connecting the cable shields and the cabinets together. However, there was still a problem whenever a cable penetrated a cabinet. At the point where the cable entered the cabinet, the perforation provided was a potential source of EMI leakage. Elaborate structures were developed to overcome this problem.

OBJECTS OF THE INVENTION

It is an object of this invention to provide a novel and improved EMI shielding structure.

Another object of this invention is the provision of an improved structure for shielding electrical equipment against EMI which is lower in cost and easier to employ than comparable prior art structures.

It is a further object of this invention to provide a novel apparatus for preserving EMI shielding integrity while passing transmission lines through shielded enclosures in continuous runs, i.e., the utilization of which apparatus does not entail severing and re-coupling of the lines.

Still another object is the provision of EMI shielding structures for transmission cables which prevents transmission of EM energy along the cable sheath without necessity of severing and re-coupling the cable.

Additional objects and advantages of this invention will become more fully apparent as the following description proceeds in conjunction with the accompanying drawing.

SUMMARY OF THE INVENTION

To the accomplishment of the foregoing and other objects the invention contemplates an EMI protection system comprising an electrically conductive frame member adapted to be disposed over and entirely encompass an opening through which shielded transmission lines are passed. Electrically conductive compressible material is contained within the frame and accommodates passage therethrough of one or more such transmission lines. Means are provided for compressing the conductive material into intimate contact with a peripherally continuous segment of the transmission.

THE PRIOR ART

Figure 1:
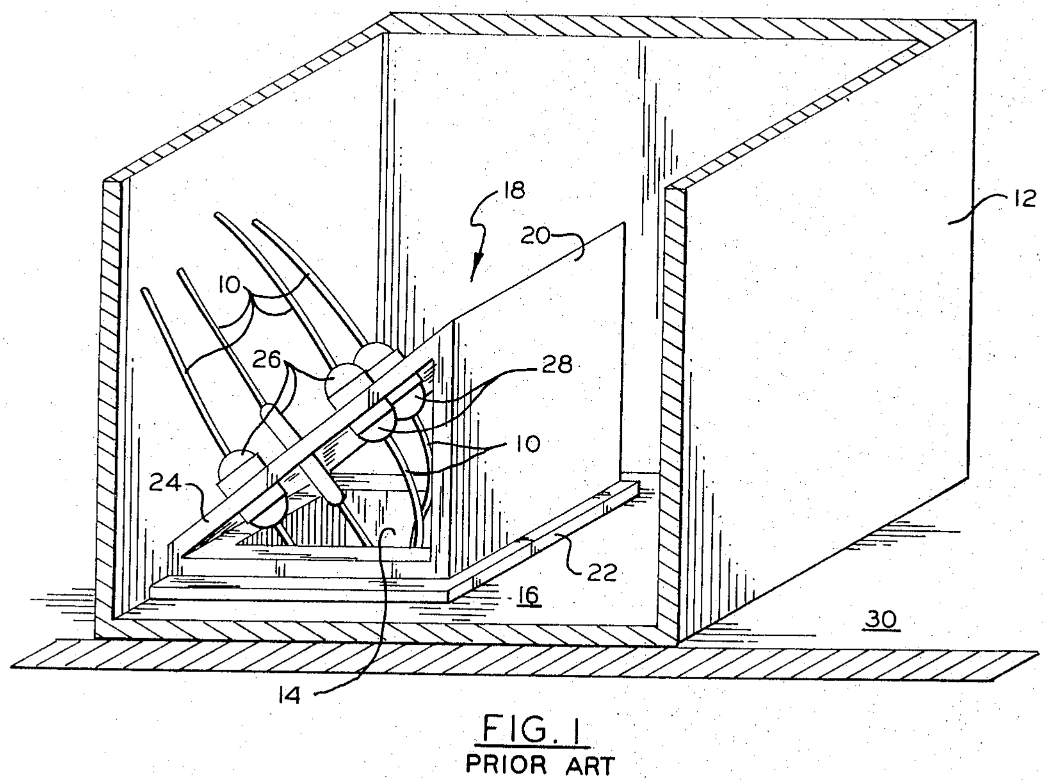
FIG. 1 PRIOR ART
FIG. 1 is a perspective view of a typical EMI shielding arrangement used in the prior art.

Referring now to the drawing and first, in particular, to FIG. 1, there is illustrated a typical prior art arrangement for EMI protection of a plurality of transmission lines or cables 10 penetrating an equipment cabinet 12 only a lower sectional portion of which is shown. As is well-known, each cable 10 is made up of a plurality of individual conductors (not shown) insulated from one another. In addition, the entire cable is covered with a conductive metallic foil which is grounded at the cable ends to provide EMI shielding. The exterior sheathing of the cable is formed of a suitable insulating material, normally a synthetic resin film, to integrate the cable and provide physical strength and protection to its internal components.

Conventionally, cabinet 12 is made of metal and, therefore, electrically conductive. When closed and suitably grounded, as is customary practice, cabinet 12 provides EMI protection for its contents. However, in order to accommodate passage of cables 10 a relatively large opening 14 is necessarily provided in the bottom wall 16 of cabinet 12 which opening provides means for entry of electromagnetic fields.

To block entry of these fields, including EMI which travels along the outer sheathing of cables 10, the cables are severed and reconnected through the medium of a coupling structure designated generally as 18. Typically, structure 18 comprises a metal enclosure 20 having one open side, at the bottom in the drawing. (In FIG. 1, the front side of enclosure 20 is omitted to expose its interior but the enclosure is normally open at the bottom only although there is usually one removable side to permit access to the interior.) Enclosure 20 is mounted with its open bottom over opening 14 and sealed to the bottom cabinet surface 16 by means of a conductive gasket 22.

To conserve space within cabinet 12, enclosure 20 usually has one sloping wall 24 in which are mounted cable connectors (not shown). The corresponding end pairs of severed cables 10 are provided with terminating members or plugs 26, 28 which are plugged into the cable connectors on opposite sides of wall 24. Plugs 26, 28 have conductive outer shells which are of course connected to the shielding of cables 10 and to enclosure 20 as well.

In FIG. 1, cabinet 12 is shown supported on a surface 30 which may be a raised floor under which cables 10 pass between the cabinets to be interconnected.

The apparatus disclosed in FIG. 1 is effective, but it is expensive in time, in materials, and in space. In a cabinet which is to be penetrated by a substantial number of cables, one-third or more of the cabinet space may be occupied by the shielding structure 20. In addition to this, every wire in each of the cables must be properly terminated into both of the plugs 26 and 28. Structures 20 are custom-built and plugs 26, 28 together with the sockets that pass through the wall 24 are expensive.

DESCRIPTION OF THE PREFERRED EMBODIMENT

Figure 2:
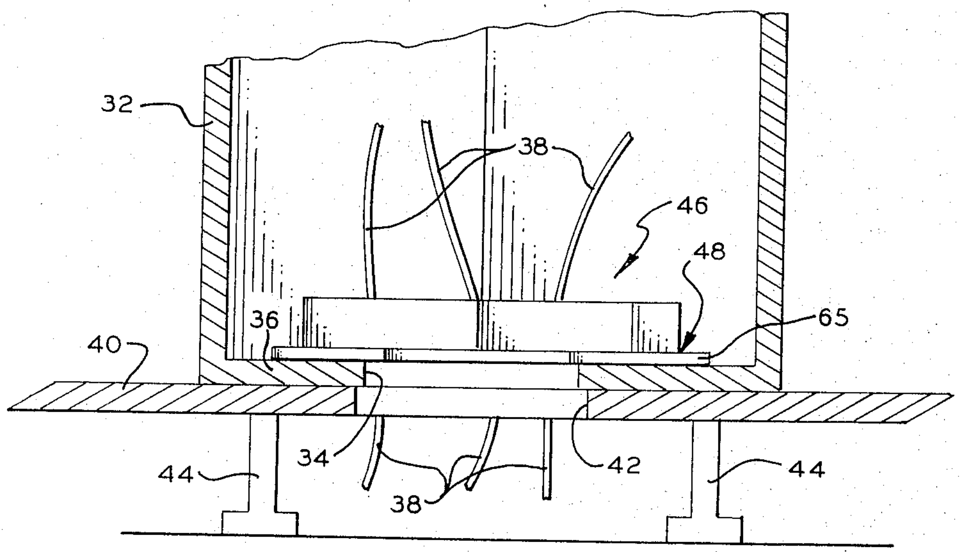
FIG. 2 is a side view, partially in section, of one form of apparatus embodying this invention.

Referring now to FIG. 2, there is shown in section a lower fragment of a metal equipment cabinet 32 in all respects comparable to cabinet 12 of FIG. 1 already described. Thus cabinet 32 has an opening 34 in its bottom wall 36 for accommodating the passage of transmission line cables 38. Cabinet 32 rests on a raised floor 40 containing an opening 42 similar in size and shape to, and in registry with, opening 34 in the cabinet bottom. Beams 44 support floor 40 and provide space through which cables 38 may pass to other similarly constructed and supported cabinets (not shown).

Mounted on cabinet floor 36 is an EMI protection system designated in its entirety by reference numeral 46. As best appears in FIG. 3 the principal component of the system is a frame member 48 including a rectangular base plate 50 containing a central aperture 52 (FIGS. 4, 5) conforming generally in size and shape to the opening 34 in cabinet floor 36.

Frame member 48 also includes, integrally formed with or secured to base plate 50, a rectangular frame 54 somewhat smaller than the base plate but large enough to encompass aperture 52. In the illustrated embodiment three sides 56, 58, 60 of the frame 54 comprise a single U-shaped unit permanently secured to base plate 50 as by welding; the fourth side, 62, essentially closing the open end of the U-shaped unit to complete frame 54, is removably secured to base plate 50 by suitable fasteners such as machine screws 64 to enable assembly of the structure 46 as will be seen presently.

A gasket 65 of deformable conductive material, e.g., conductive rubber is interposed between confronting surfaces of frame member 48 (specifically, its base plate 50) and the bottom wall 36 of cabinet 32; the frame member is secured in position over aperture 52 as by means of machine screws 67.

Figure 3:
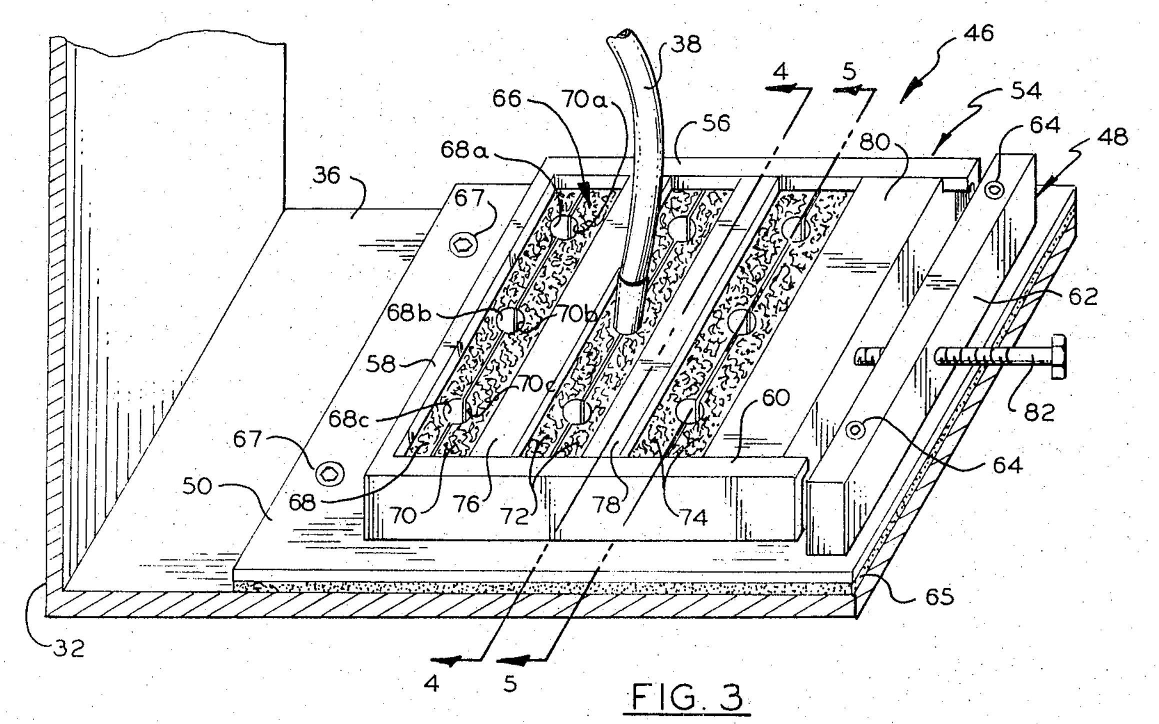
FIG. 3 is a perspective view of the apparatus shown in FIG. 2.
Figure 4:
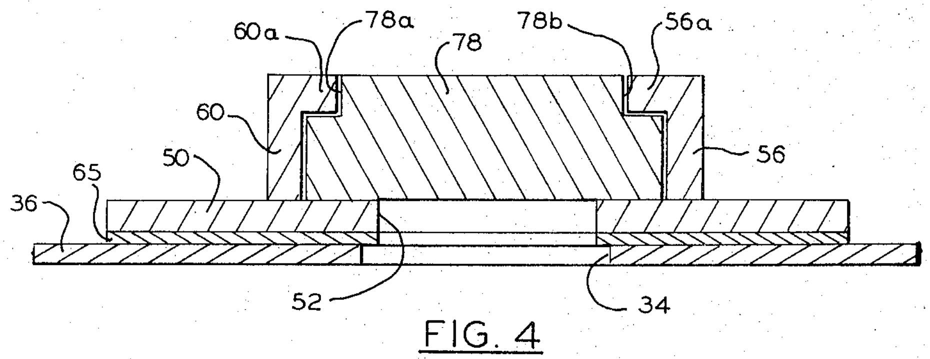
FIGS. 4 and 5 are respective sectional views on lines 4—4 and 5—5 of FIG. 3.

Contained within frame member 48 is a body of compressible electrically conductive material 66 accommodating passage therethrough of cables 38, only one of which is shown in FIG. 3.

Figure 5:
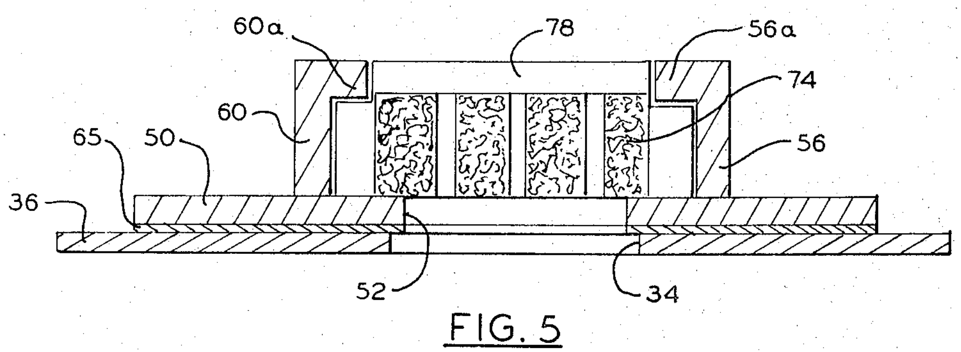

The body of compressible material 66 is made up of at least one pair of parallelopiped strips 68, 70 slidably disposed in frame 54 in parallelism with side 58. In the illustrated embodiment two more pairs of strips 72 and 74 are shown but it will be appreciated that a single pair of any reasonable number of additional pairs can be used depending largely on the number of cables 38 to be accommodated. As all such strips are identical only 68, 70 will be described in detail. The confronting surfaces of each strip 68 and 70 contain one or more (three are shown) hemicylindrical recesses **68*a*, 68*b*, 68*c* and 70*a*, 70*b*, 70*c*, respectively. The recesses are arranged in mating pairs, as shown, each pair defining an aperture through compressible material 66 for the passage of cables 38.**

Where more than one pair of compressible strips 68, 70 are utilized, each pair is separated by spacers 76, 78 each consisting of a substantially rigid block of electrically conductive material. As best appears in FIGS. 4 and 5, spacer 78 (typical) is notched as at **78*a*, 78*b* at each end to slidably receive a respective rim or flange 56*a*, 60*a* formed on the upper edges of frame sides 56, 60. Thus, spacers 76, 78 are slidably channelled in frame member 48. As shown in FIG. 5, compressible strips 68, 70 (strip 74 appearing in this figure) need not conform to the shape of spacers 76, 78.**

The compressible strips may be made of any suitable electrically conductive material such as conductive foam or sponger rubber.

A compression member 80 in the form of a substantially rigid block of electrically conductive material is slidably disposed in frame 54 parallel to the strips 68, 70, etc., and spacers 72, 74 and adjacent the open side of the U-shaped unit. Compression member 80 is of the same general configuration as spacers 72, 74 and similarly channelled frame 54.

A screw adjustment member 82 threaded in side 62 of frame 54 has its inner end in abutment with or journaled in compression member 80; thus by turning adjustment screw 82, compression member 80 can be displaced inwardly (toward side 58) to compress the strips of compressible material.

INSTALLATION AND ASSEMBLY

From the foregoing description it will be seen that frame member 48 may be installed by first placing base plate 50, with gasket 65, in position on floor 36 of the cabinet so that aperture 52 is in registration with opening 34 — and fastening the plate with screws 67. This done, cables 38 are prepared by removing a short, peripherally continuous segment of the sheathing so as to expose the underlying foil shielding layer. The length of the exposed shielding should be roughly equal to the thickness dimension of material 66, i.e., the axial dimension of the bores formed by hemicylindrical recesses **68*a*, 70*a*,** for example.

With the cables thus prepared, the first strip 68 is positioned in frame 74, followed by three cables (in the illustrated embodiment) and strip 70. Spacer 76 is then installed and the same sequence repeated for the remaining strips, cables and spacers. After the final strip 74 is in position, compression block 80 is installed by sliding it into the frame and then securing closing side 62 in place with screws 64. When the assembly is complete, screw adjustment member 82 is turned the amount necessary to compress the compressible strips into intimate enveloping contact with the exposed shielding on cables 38. In this manner, a direct, electrically conductive path is formed to ground the cable shielding to the cabinet which, as previously explained, is itself suitably grounded. This is accomplished without the need for severing and recoupling cables and, therefore, without the attendant cost, complexity, and possibility for error in connecting individual conductors involved in providing and installing plugs, etc. In addition, the EMI shielding is achieved without the bulky space-consuming enclosure (20, FIG. 1) which typifies the prior art. In this connection, it is pointed out that the overall height of the frame member 54 normally is only about two inches thus conserving a very appreciable amount of cabinet space. In large systems this can amount to the saving, i.e., elimination of, one or more complete cabinets which therefore even reduces the number of EMI shielding structures which must be employed.

Although the invention has been shown and described with respect to a preferred embodiment thereof, it should be understood by those skilled in the art that various changes and omissions in the form and detail thereof may be made therein without departing from the spirit and the scope of the invention.

What is claimed and desired to be protected by U.S. Letters Patent is:

1. For use with a metallic enclosure for electronic equipment having an opening therein for passage of shielded electrical transmission lines between the interior and the exterior of the enclosure, an electromagnetic interference protection system comprising:

a. an electrically conductive frame member adapted to be disposed over and entirely encompass said opening;
b. electrically conductive compressible material contained within said frame and accommodating the passage therethrough of at least one of such transmission lines; and
c. means for compressing said material into intimate enveloping contact with a peripherally continuous segment of the shielding of said transmission lines.

2. A system according to claim 1 including a layer of deformable electrically conductive material interposed between confronting surfaces of said frame member and the enclosure to form a gasket sealing against passage of electromagnetic energy.

3. A system according to claim 2 wherein said transmission lines extend in a continuous run through said frame member and include an electrically non-conductive sheath interrupted at the site of passage through said compressible material to enable the aforesaid contact between said compressible material and shielding.

4. A system according to claim 3 wherein said frame member is of parallelogram configuration; said resilient material is in the form of at least one pair of rectangular strips slidably disposed in said frame member with their longer edges in parallelism and parallel to one side of the frame member; and said compressing means includes an essentially rigid electrically conductive member disposed in said frame member between said strips and the side of said frame member opposite said one side.

5. Apparatus for shielding an opening against electromagnetic interference comprising:

a. an electrically conductive plate containing an aperture generally conforming in size and shape to the opening to be shielded;
b. a frame of parallelogram configuration fixedly disposed on one side of said plate surrounding said aperture;
c. at least one pair of rectangular strips of electrically conductive compressible material slidably disposed within said frame in parallel abutting relation with each other and one side of said frame;
d. an essentially rigid, generally rectangular block of electrically conductive material slidably disposed in said frame in parallelism with and between said strips and the side of said frame opposite said one side; and
e. means for displacing said block toward said one side of the frame to compress said strips of compressible material.

6. Apparatus according to claim 5 including a plurality of said pairs of compressible strips disposed in parallelism with said one pair and including an essentially rigid, generally rectangular spacer member of electrically conductive material slidably disposed in said frame between each of said pairs of deformable strips.

7. Apparatus according to claim 6 wherein confronting surfaces of each pair of said compressible strips contain mating hemicylindrical recesses jointly defining an aperture extending generally normal to the plane of said plate.

* * * * *